(12) United States Patent
Davis

(10) Patent No.: US 8,517,402 B2
(45) Date of Patent: Aug. 27, 2013

(54) WHEELBARROW MOUNTED YARD WASTE BAG SYSTEM

(76) Inventor: Thomas J Davis, Olympia, WA (US)

(*) Notice: Subject to any disclaimer, the term of this patent is extended or adjusted under 35 U.S.C. 154(b) by 174 days.

(21) Appl. No.: 12/966,403

(22) Filed: Dec. 13, 2010

(65) Prior Publication Data

US 2011/0260419 A1 Oct. 27, 2011

Related U.S. Application Data

(60) Provisional application No. 61/327,584, filed on Apr. 23, 2010.

(51) Int. Cl.
*B62B 1/22* (2006.01)

(52) U.S. Cl.
USPC .................. 280/47.31; 220/495.08

(58) Field of Classification Search
CPC ................................ B62B 1/22; B65F 1/1415
USPC ............. 280/47.31, 47.26, 47.18, 47.19; 383/33, 80; 141/390, 391, 10, 108, 314, 141/316; 248/99, 101; 298/3; 220/9.1, 495.08, 220/495.11
See application file for complete search history.

(56) References Cited

U.S. PATENT DOCUMENTS

| | | | |
|---|---|---|---|
| 191,502 A | 5/1877 | Wing | |
| 430,355 A * | 6/1890 | Stone | 141/108 |
| 544,585 A * | 8/1895 | Mayo | 141/341 |
| 657,284 A * | 9/1900 | Eddy | 248/100 |
| 2,768,022 A | 10/1956 | Pope | |
| 3,111,333 A * | 11/1963 | Marini et al. | 280/47.19 |
| 3,161,434 A * | 12/1964 | Jerpbak | 296/36 |
| 3,418,005 A * | 12/1968 | Allina | 280/47.26 |
| 3,692,072 A * | 9/1972 | Kohls | 141/391 |
| 3,756,548 A * | 9/1973 | Santarelli et al. | 248/98 |
| 3,771,752 A | 11/1973 | Meeh | |
| 3,774,930 A | 11/1973 | Pravednekow | |
| 3,875,981 A | 4/1975 | Brenner et al. | |
| 3,915,329 A * | 10/1975 | Zaks | 141/390 |
| 4,312,531 A | 1/1982 | Cross | |
| 4,411,300 A * | 10/1983 | Rico | 383/33 |
| 4,601,315 A * | 7/1986 | France | 141/231 |
| 4,629,203 A | 12/1986 | Ballard | |
| 4,664,348 A * | 5/1987 | Corsaut et al. | 248/99 |
| 4,697,834 A * | 10/1987 | Scott | 280/47.26 |

(Continued)

OTHER PUBLICATIONS http://WASTEBAGGER.com (Waste Bagger).

(Continued)

*Primary Examiner* — Katy M Ebner
*Assistant Examiner* — Brodie Follman
(74) *Attorney, Agent, or Firm* — Dean A. Craine

(57) ABSTRACT

A portable yard waste bag system that includes a bag holding accessory that attaches to the top edge of a wheelbarrow that temporarily holds a yard waste bag in an opened position in the bucket. The accessory includes a top ring with a pendent skirt. The lower edges of the front section of the skirt curves around and connects to the top edge of a wheelbarrow. When assembled on the wheelbarrow, the lower edge of the skirt engages the bucket's front top edge while the top ring is held in a forward extending, diagonally position directly over the wheel. A waste bag is unfolded and extends through the top ring's center opening so that the bag's bottom end rests inside the bucket. The top edge of the bag is folded over the top ring. An optional lid is provided and connects over the top ring to close the bag.

7 Claims, 4 Drawing Sheets

(56) References Cited

U.S. PATENT DOCUMENTS

| | | | |
|---|---|---|---|
| 4,749,158 A * | 6/1988 | Buckley | 248/98 |
| D311,084 S * | 10/1990 | Batchelor | D34/27 |
| 5,031,277 A * | 7/1991 | Coker | 15/257.3 |
| 5,056,679 A * | 10/1991 | Lonczak | 141/390 |
| 5,082,219 A * | 1/1992 | Blair | 248/99 |
| 5,449,083 A * | 9/1995 | Dougherty et al. | 220/9.1 |
| 5,842,595 A | 12/1998 | Williams | |
| 6,076,566 A * | 6/2000 | Lowe | 141/10 |
| 6,131,759 A * | 10/2000 | Young | 220/495.11 |
| 6,209,596 B1 * | 4/2001 | Wong | 141/391 |
| 6,213,482 B1 * | 4/2001 | Yemini | 280/47.26 |
| 6,213,532 B1 * | 4/2001 | Dunyon | 296/32 |
| 6,293,505 B1 * | 9/2001 | Fan | 248/99 |
| 6,708,742 B2 * | 3/2004 | Weathers et al. | 141/391 |
| 6,755,478 B2 | 6/2004 | Messinger-Rapport | |
| 6,908,089 B1 * | 6/2005 | Stark et al. | 280/47.31 |
| 6,994,302 B1 * | 2/2006 | Simmons | 248/98 |
| 7,144,019 B2 * | 12/2006 | Lee | 280/47.26 |
| 7,219,705 B2 | 5/2007 | Wallek | |
| 7,222,825 B2 * | 5/2007 | Gilbert | 248/95 |
| 7,302,978 B1 * | 12/2007 | Kolarik | 141/391 |
| 7,350,547 B2 * | 4/2008 | Quiring | 141/391 |
| D605,372 S * | 12/2009 | Wilkinson | D34/6 |
| 7,703,723 B1 * | 4/2010 | Cooper et al. | 248/97 |
| 7,909,377 B2 * | 3/2011 | Hopp | 294/50.8 |
| 7,922,023 B2 * | 4/2011 | Dommerholt | 220/262 |
| 7,946,764 B2 * | 5/2011 | Sulpizio et al. | 383/33 |
| 7,980,455 B2 * | 7/2011 | Leiva Burgos | 232/1 R |
| D659,935 S * | 5/2012 | Smith | D34/27 |
| 8,245,864 B2 * | 8/2012 | Garland | 220/252 |
| 2002/0130225 A1 * | 9/2002 | Wong | 248/99 |
| 2003/0201616 A1 * | 10/2003 | Friel | 280/47.31 |
| 2004/0045084 A1 * | 3/2004 | Klosterman | 4/661 |
| 2004/0188572 A1 * | 9/2004 | Sibley | 248/98 |
| 2004/0195140 A1 * | 10/2004 | Friel | 206/514 |
| 2004/0222333 A1 * | 11/2004 | Quick | 248/99 |
| 2005/0103951 A1 * | 5/2005 | Metcalfe | 248/99 |
| 2005/0199767 A1 * | 9/2005 | Gilbert | 248/97 |
| 2006/0078411 A1 * | 4/2006 | Casab | 414/408 |
| 2006/0108367 A1 * | 5/2006 | Sibley | 220/495.07 |
| 2006/0151675 A1 * | 7/2006 | Morris et al. | 248/99 |
| 2006/0266893 A1 * | 11/2006 | Kelley | 248/97 |
| 2007/0001063 A1 * | 1/2007 | Cheng | 248/95 |
| 2007/0210218 A1 * | 9/2007 | Borland | 248/101 |
| 2007/0289671 A1 * | 12/2007 | Kolarik | 141/391 |
| 2009/0032653 A1 * | 2/2009 | Gilligan et al. | 248/98 |
| 2009/0034886 A1 * | 2/2009 | Conforti | 383/43 |
| 2009/0212517 A1 * | 8/2009 | Stark et al. | 280/47.31 |
| 2010/0108826 A1 * | 5/2010 | Fernandez et al. | 248/98 |
| 2010/0201090 A1 * | 8/2010 | Henniges et al. | 280/47.26 |
| 2010/0230482 A1 * | 9/2010 | Leiva Burgos | 232/1 R |
| 2010/0301050 A1 * | 12/2010 | Garland | 220/495.08 |
| 2011/0109055 A1 * | 5/2011 | Tol et al. | 280/47.31 |
| 2011/0216988 A1 * | 9/2011 | Sulpizio et al. | 383/33 |
| 2011/0260013 A1 * | 10/2011 | Richardson | 248/99 |
| 2011/0280498 A1 * | 11/2011 | Propp | 383/1 |
| 2011/0290956 A1 * | 12/2011 | Saue et al. | 248/99 |
| 2011/0309209 A1 * | 12/2011 | Muse | 248/97 |
| 2012/0080569 A1 * | 4/2012 | Kramer | 248/101 |

OTHER PUBLICATIONS www.sheedison.com (Snap Bagger).

* cited by examiner

WHEELBARROW MOUNTED YARD WASTE BAG SYSTEM

This is a utility patent application which claims benefit of U.S. Provisional Application No. 61/327,584, filed on Apr. 23, 2010.

BACKGROUND OF THE INVENTION

1. Field of the Invention

This invention relates to yard waste disposal systems, and more particularly to such systems that use a flexible bag that is filled and transported in a wheelbarrow.

2. Description of the Related Art

It is common for homeowners to deposit yard waste into a disposable or reusable paper or plastic bag which is either left at the curbside or emptied into a larger yard waste bin for pickup by a sanitary worker.

One problem with using bags for collecting yard waste is that it can be difficult to hold the bag in an unfolded extended position and in an open position to dispose yard waste into the bag. This is especially problematic when depositing yard waste into a new bag or a partially filled bag that is wet from being stored outdoors. It is also problematic when depositing yard waste into the bag from a wide rake or a lawn mower grass catcher.

Another problem with using plastic bags is that the yard waste gradually settles at the bottom of the bag and causes the bag to take on a conical or an 'beaker-like' shape. If the yard waste is heavy, the user must support the bottom of the bag when lifting the bag to prevent tearing.

Many homeowners own wheelbarrows that are used to transport plants, beauty bark, planting soil, fertilizer, and open yard waste. Most wheelbarrows have a single front wheel that enables it to be moved by lifting the handles and pushing it over the uneven or wet terrain. Unfortunately, the single front wheel makes the wheelbarrow susceptible to tipping over if the cargo is not evenly dispersed in the bucket.

What is needed is an accessory that can be easily attached to the bucket of a wheelbarrow that holds a disposable yard waste bag in an open, partially extended position in the bucket. What is also needed is an accessory that centrally aligns the bag in the bucket to prevent unbalance cargo. What is also needed is an accessory that continuously holds the bag's opening in an open position and can be selectively closed by a lid so that partially filled bags may be temporarily closed to keep the yard waste in the bag dry. What is also needed is an accessory that can be easily attached or detached from the wheelbarrow so that the wheelbarrow may still be used for hauling other cargo.

SUMMARY OF THE INVENTION

The above stated needs are met by a wheelbarrow mounted yard waste bag system that includes a bag holding accessory that selectively attaches to the top edge of a wheelbarrow bucket. Disposed inside the bag holding accessory is a disposable bag which is held in a open and partially expanded position over the bucket's center axis. The bag holding accessory holds the top opening of the bag in an elevated, diagonally aligned positioned over the bucket so that the user may easily fill the bag while standing adjacent to the bucket. When attached to the accessory, the closed bottom end of the bag rests inside the waste deposit area in the bucket.

More specifically, the bag holding accessory includes a rigid top ring with a pendent skirt that extends downward from the top ring partially engage a section of the top edge of the bucket to hold the top ring in a diagonally aligned, elevated position above the bucket. The skirt includes a first section that extends downward from the top ring and a second section that extends downward from the opposite side of the top ring. In the embodiment shown herein, the first and second sections are each made of a plurality of radially aligned, downward extending, flexible leaves. The distal edges of the leaves on the first section are connected to a horizontally aligned front strap that extends over the top edge of the bucket. The distal ends on the leaves located on the second section are attached to a second strap that extends transversely over the bucket near the bucket's midline axis. The leaves on the first and second sections are sufficiently strong so that the top ring with the top end of the waste bag attached thereto is continuously supported in an elevated position above the bucket while and the closed end of a waste bag rests inside the bucket.

When assembled on the bucket of a wheelbarrow, the front strap rests over and may engage the top edge of the bucket and the second strap extends transversely over the bucket from one side to the opposite side. A waste bag is unfolded and extended downward through the center opening formed in the top ring. The diameter and width of the top ring is sufficient so that top edge of the waste bag may be folded downward over the outside surface of the top ring, thereby temporarily attaching the top edge of the bag to the top ring. In one embodiment, the top ring is elevated and tilted forward over the bucket so that the user may stand in the front of the bucket and easily deposit yard waste directly into the bag. During use, the bag's top opening remains open thereby enabling the user to continuously fill the bag. An optional lid is provided that connects to the top ring when a bag is attached to the top ring hereby enabling the user to temporarily close the bag while it is attached to the top ring. When the bag is full of yard waste, the lid is removed, the top edge of the bag is unfolded from the top ring, and the accessory is then removed from the bucket. The bag is then transport via the wheelbarrow to the desire deposit site.

DESCRIPTION OF THE PREFERRED EMBODIMENT(S)

Figure 1:
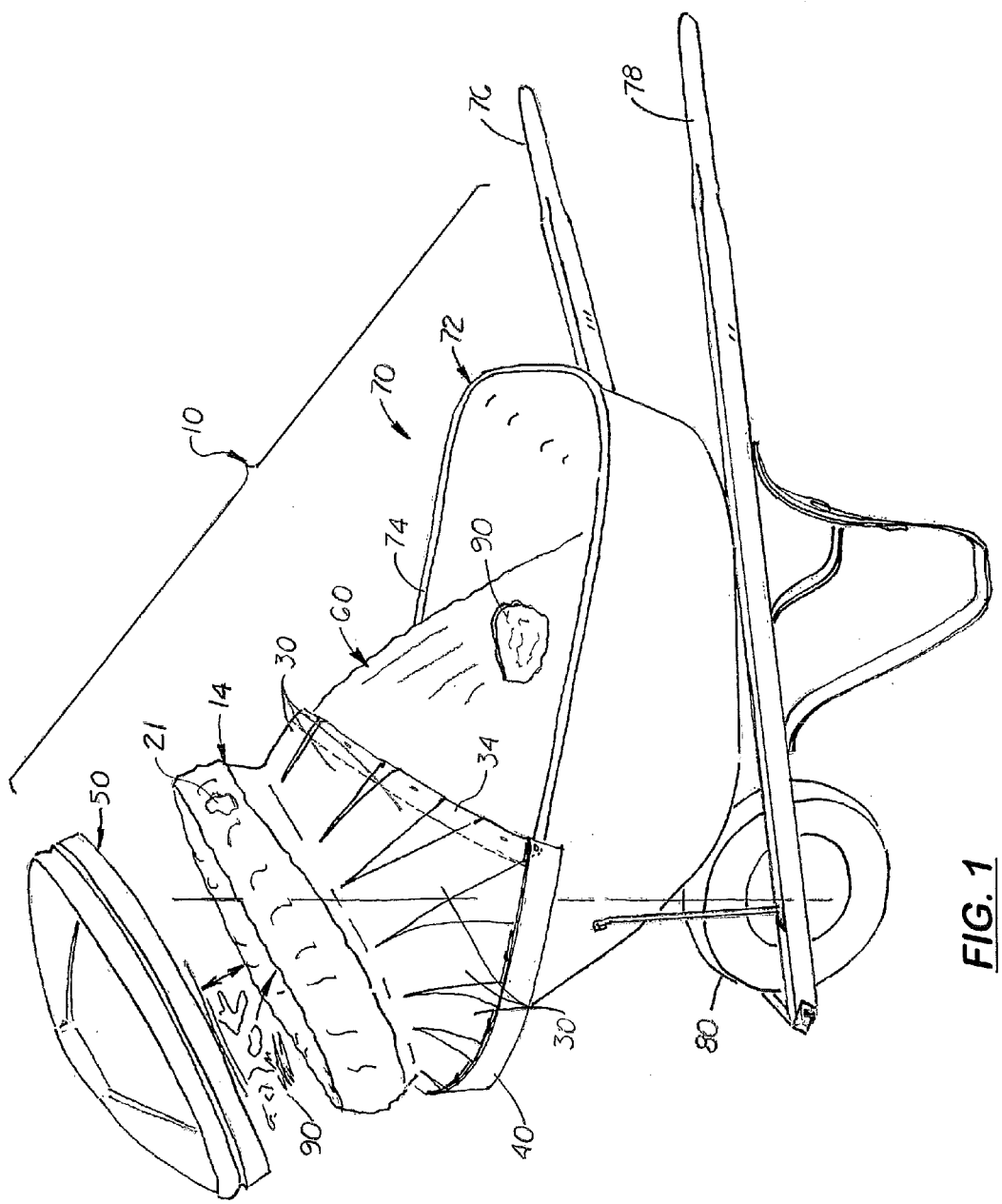
FIG. 1 is a perspective view of the system that includes a wheelbarrow with the bag holding accessory attached to the top edge of the bucket, a disposable bag is placed in the accessory and held in a filling position, and with a removable lid.

FIG. 1 is a perspective view of the portable yard waste bag system 10 that includes a wheelbarrow 70 with the bag holding accessory 14 attached to the top edge 74 of wheelbarrow's bucket 72. Located inside the bag holding accessory 14 is a disposable or reusable waste bag 60 which is held is a suitable position on the bucket 72 for depositing yard waste. The accessory 14 also holds the bag 60 in a relatively fixed upright position inside the bucket 72 so that the wheelbarrow 70 does not become imbalanced when moved. When the waste bag 60 is full, the accessory 14 can be easily removed from the waste bag 60 and the waste bag 60 can be easily lifted and removed or dumped from the bucket 72. An optional lid 50 is also provided that attaches to the accessory 14 that allows a waste bag 60, while still attached to the accessory 14, to be selectively closed.

Figure 2:
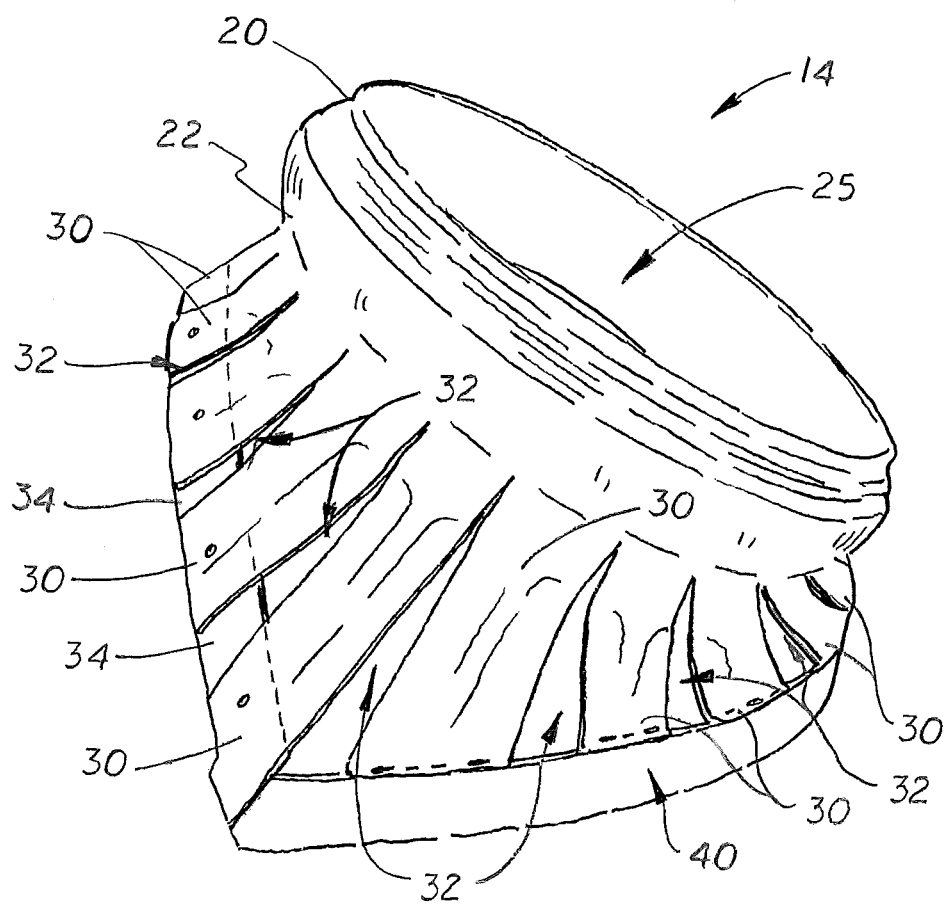
FIG. 2 is a side perspective view of the bag holding accessory.
Figure 3:
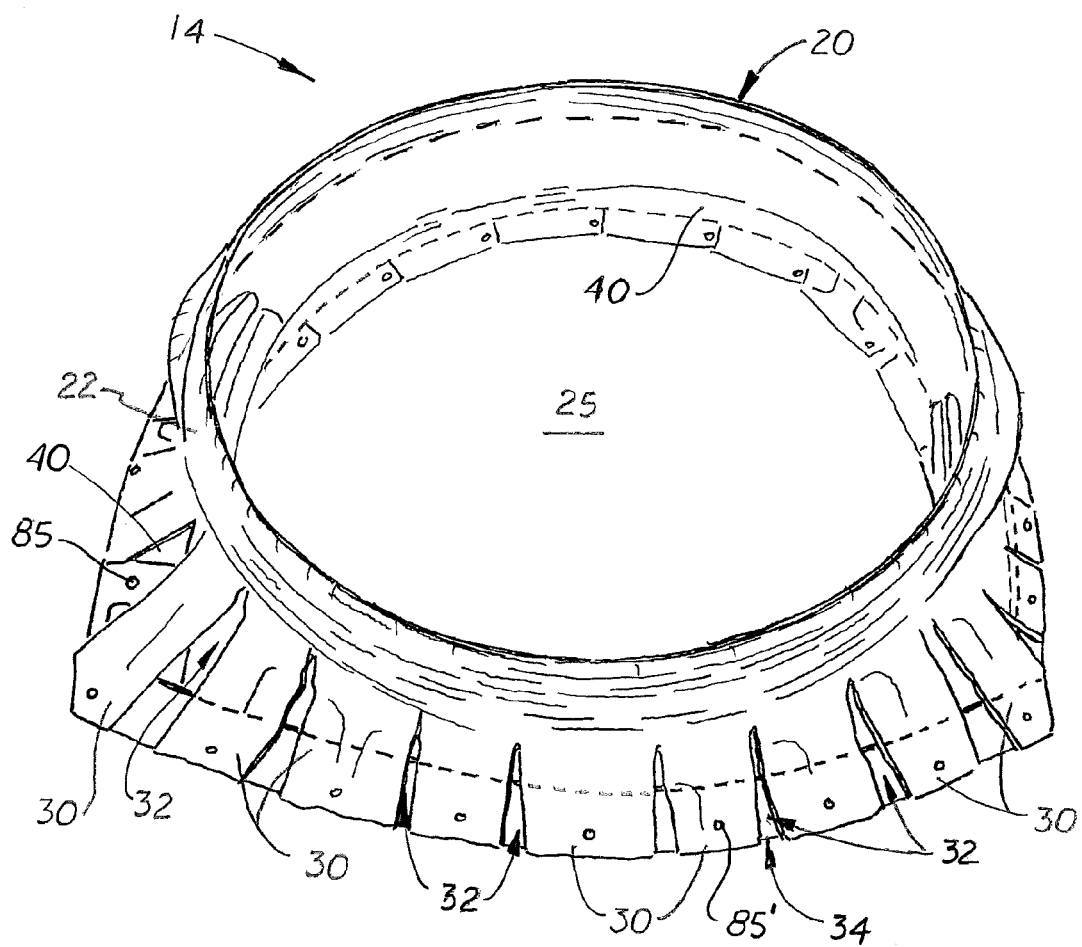
FIG. 3 is a rear perspective of the bag holding accessory.

As shown more clearly in FIGS. 2 and 3, the bag holding accessory 14 includes a rigid top ring 20 with a pendent skirt 22 with a plurality of outward bending leaves 30 formed thereon. The leaves 30 are created by straight cuts in the plastic panel that create a plurality of V-shaped slits 32 cut longitudinally in the skirt 22 that enable the skirt 22 to bend and conform to different bucket shapes.

Figures 4, 5:
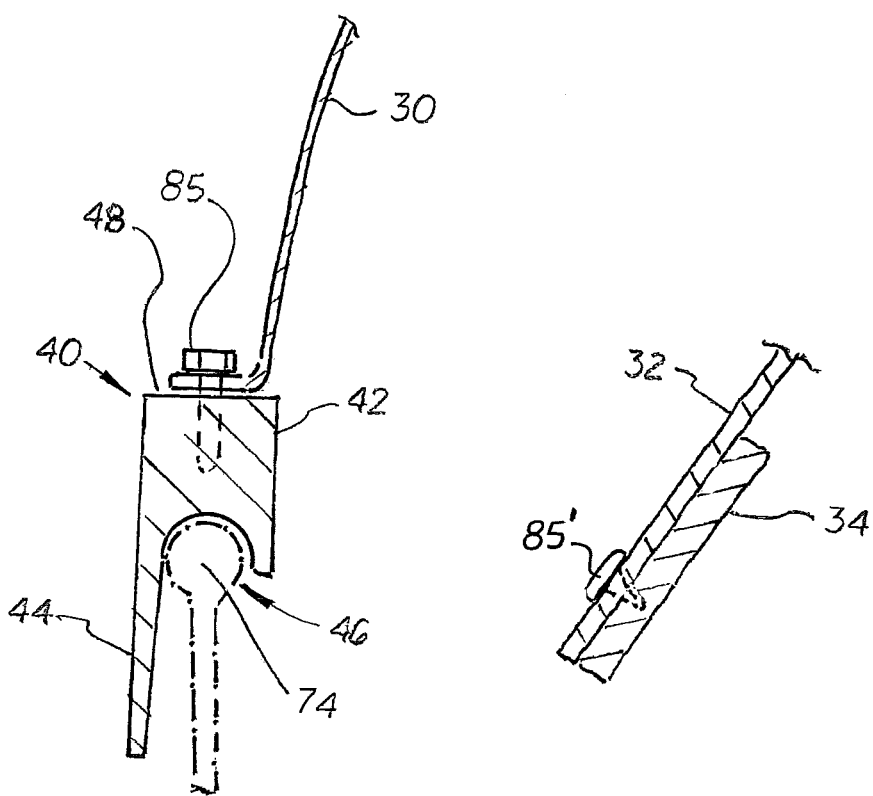
FIG. 4 is a sectional side elevational view of the front strap with a receiving slot formed therein that rests over the top edge of the wheelbarrow's bucket.
FIG. 5 is a sectional side elevational view of the rear strap attached to a leaf.

The lower edges of the leaves 30 on the front and side surfaces of the skirt 22 are connected to a flexible front strap 40 designed to bend around the front, top edge 74 of the bucket 72. As shown in FIG. 4, the front strap 40 includes a main body 42 with a front face 41 and a downward facing top edge engaging slot 46. The front strap 40 is sufficient in length to extend entirely around the front curved top edge 74 of the bucket 72. During use, the front strap 40 is aligned over the front curved top edge 74 of the bucket 72 and forced downward so that the top edge 74 is forced into the edge engaging slot 46. Suitable connectors 85 are used to attach the lower edges of the leaves 30 to the top surface 48 on the main body 42.

The second strap 34 extends transverse over the bucket 72 and connects to the opposite ends of the first strap 40. The second strap 34 is made of semi rigid, flexible material that bends slightly upward to hold the top ring 20 in a forward, diagonally aligned orientation over the bucket 72 as shown in FIG. 1. During use, the second strap 34 extends above the bag 60 a substantial distance so that the bag 60 may expand when filled with yard waste 90. Suitable connectors 85' are used to attach the lower edges of the leaves 30 to the sides of the secondary strap 34.

An important aspect of the skirt 22 is that it holds the top ring 20 in an elevated, forward facing diagonally aligned position and centrally aligned over the wheelbarrow's wheel 80 at all times. This allows the waste bag 60 to be completely filled with light to medium weight yard waste and keeps the waste bag 60 centrally located in the bucket 72.

When assembled on a wheelbarrow 70, the front strap 40 engages the top front edge 74 of the bucket 72. A waste bag 60 is unfolded and extended through the top ring 20. The top edge 62 of the waste bag 60 is folded rearward and over the outside surface of the top ring 20. As the user gradually fills the waste bag 60, the skirt 22 holds the top ring 20 in an elevated position above the bucket 72. A removable, optional lid 50 is provided that connects over the top ring 20 that enables the user to close the top opening of the waste bag 60.

The top ring 20 measures 15 to 20 inches in diameter. The neck of the top ring 20 is approximately 3 inches in length. The skirt which is mounted to or integrally formed with the neck 21 has a curved front edge and a straight rear edge.

The top ring 20, the neck 21 and the skirt 22 are made of durable plastic used to manufacture a plastic 30 gallon garbage can with a side wall thickness of 1/8 to 3/8 inches thick. The leaves 30 formed on the skirt 22 are slightly conical and fan outward and approximately 12 to 15 inches in length and approximately 2 inches in width near the top ring 20 and consistent to their distal ends.

In compliance with the statute, the invention described herein has been described in language more or less specific as to structural features. It should be understood, however, that the invention is not limited to the specific features shown, since the means and construction shown is comprised only of the preferred embodiments for putting the invention into effect. The invention is therefore claimed in any of its forms.

I claim:

1. A yard waste bag filling and transport system, comprising:
    a. a wheelbarrow with a bucket and at least one wheel located under said bucket, said bucket includes a top edge;
    b. a yard waste bag with a top opening and a closed end; and,
    c. a bag holding accessory for supporting and holding said waste bag in an upward extending filling position over said bucket of said wheelbarrow, said bag holding accessory includes a top ring which is smaller than a perimeter of said bucket, said top ring having a center opening through which said waste bag extends, said top ring configured to temporarily hold said top opening on said waste bag in a diagonally aligned, open position for filling with yard waste, said bag holding accessory also includes a skirt mounted to or integrally formed on said top ring that extends downward from said top ring and engages said top edge on said bucket to support and hold said top ring and said top opening of said waste bag in an elevated, diagonal position with respect to said top edge of said bucket and simultaneously supporting said closed end of said waste bag inside said bucket and over said wheel.

2. The yard waste bag filling and transport system, as recited in claim 1, wherein said bucket includes a front top edge and said skirt has a lower edge that is curved and engages said front top edge.

3. The waste bag filling and transport system, as recited in claim 1, further including a lid that selectively attaches to said top ring.

4. The waste bag system, as recited in claim 2, further including a lid that selectively attaches to said top ring.

5. The yard waste bag filling and transport system, as recited in claim 1, wherein said skirt holds said top ring in a forward facing, elevated, diagonally aligned orientation over said bucket.

6. The yard waste bag system, as recited in claim 5, further including a lid that selectively attaches to said top ring.

7. A method for filling yard waste into a yard waste bag comprising the following steps:
    a. selecting a wheelbarrow that includes a bucket with at least one wheel located under said bucket, said bucket includes a top edge;
    b. selecting a waste bag holding accessory for holding a waste yard bag in a diagonal extending position in said bucket, said bag holding accessory includes a top ring having a smaller perimeter than a perimeter of said bucket, said top ring having a downward extending skirt which selectively engages said top edge of said bucket and holds a yard bag positioned above said bucket, aligned in an elevated, diagonal position with respect to said top edge of said bucket and positioned substantially over said wheel;
    c. selecting and unfolding a yard waste bag with an open end and a closed end, said open end being configured to attach to said top ring on said holding accessory and being sufficient in length so that said closed end is positioned inside the bucket of said wheelbarrow;
    d. inserting said yard waste bag into the center opening of said top ring on said holding accessory so that said closed end is supported by said bucket and said open end is attached to said top ring; and, e. inserting yard waste through said open end of said yard waste bag supported by said top ring until said yard waste bag is filled with a desirable amount of yard waste.

\* \* \* \* \*